United States Patent [19]
Polley et al.

[11] Patent Number: 5,165,637
[45] Date of Patent: Nov. 24, 1992

[54] CAKE JACK

[76] Inventors: John Polley; Constance M. Polley, both of 8293 Tinkler, Sterling Heights, Mich. 48312

[21] Appl. No.: 796,658

[22] Filed: Nov. 25, 1991

[51] Int. Cl.$^5$ ............................................. F16M 11/00
[52] U.S. Cl. .................................. 248/188.4; 108/101; 428/7
[58] Field of Search ............... 248/354.1, 188.4; 33/525; 108/101; 428/7

[56] References Cited

U.S. PATENT DOCUMENTS

| | | | |
|---|---|---|---|
| 1,619,818 | 3/1927 | Gowans | 428/7 X |
| 2,178,166 | 10/1939 | Enstrom | 108/101 |
| 2,719,383 | 10/1955 | Emmert | 248/188.4 |
| 2,902,174 | 9/1959 | Audsley | 211/141 |
| 2,921,691 | 1/1960 | Dembinski | 428/7 X |
| 3,070,236 | 12/1962 | Macpherson, Sr. | 108/101 X |
| 3,169,496 | 2/1965 | Muggli et al. | 428/7 X |
| 3,236,389 | 2/1966 | Murdock | 428/7 |
| 3,690,610 | 9/1972 | Peirce | 108/101 |
| 3,814,032 | 6/1974 | McMains | 108/101 |
| 4,069,772 | 1/1978 | Haapala | 428/7 |
| 4,676,005 | 6/1987 | Seligman | 33/525 X |

FOREIGN PATENT DOCUMENTS 653229 5/1951 United Kingdom ................ 428/7

Primary Examiner—David L. Talbott
Attorney, Agent, or Firm—Charles W. Chandler

[57] ABSTRACT

Cake plates in a multi-tiered cake are supported by adjustable length rods inserted into cake layers below the supported plates. By adjusting the lengths of the support rods it is possible to compensate for small variations in cake layer thickness and minor thickness variations within each cake layer. Each adjustable length rod can take the form of a main rod element having a threaded bore, and a rod extension element having a threaded shank extending into the bore. The adjustable length rod assemblies can be manufactured at relatively low cost.

7 Claims, 1 Drawing Sheet

CAKE JACK

BACKGROUND OF THE INVENTION

1. Field of the Invention

This invention relates to edible cakes, and particularly to mechanisms for supporting one cake layer (or tier) above another cake layer, such that the upper layer does not damage or deform the lower cake layer.

2. Prior Developments

It is known to form cakes, such as wedding cakes, anniversary cakes, birthday cakes, etc., as multi-layer cakes of a stepped or tiered construction. Commonly the lowermost tier or layer is a generally cylindrical cake having a diameter of about 16 inches, and a vertical height of about 4 inches. The next layer has a somewhat smaller diameter, e.g. 14 inches and possibly the same or a slightly lesser vertical thickness. Succeeding layers have successively smaller diameters, to provide a stepped or tiered configuration.

Each cake layer is placed on a circular plate platform or disk having a diameter that is the same or slightly larger than the diameter of the cake layer. In order to prevent each upper cake unit (plate plus cake layer) from sinking into a lower cake unit, it is common practice to support each cake unit (especially the lowermost unit) by means of dowel rods inserted vertically into the next lowermost cake unit. Each support dowel rod has its lower end resting on the plate of one cake unit and its upper end abutting the undersurface of the plate for the next cake layer (unit).

Each dowel rod acts as a vertical, structural support post for the overlying cake plate. Several rods are required to provide a balanced support for each cake tier. Typically four to eight rods are necessary for each supported cake plate, with the number of rods being dependent primarily on the diameter of the cake plate and weight of the associated cake layer. The rods are usually oriented in a ring pattern, spaced a slight distance inwardly from the outer edge of the supported cake plate. The plate can be of various materials, e.g. thin sheet plastic, aluminum, or doublefaced corrugated cardboard. The ends of the rods are flat and normal to the rod axis in order to have facial contact with the plate surface, without producing any wobble of the rod. Also, the rod length is chosen or adjusted so that the supported cake plate is level, i.e. not slanted or tilted. If the plates are tilted to any appreciable extent, the entire cake has an unattractive appearance and the lack of support may cause the cake to fall. Also, one or more layers may shift laterally relative to other cake layers One difficulty arises because a given cake layer may not have a uniform vertical thickness at all points on its surface. For example, the cake may rise unevenly in the baking process so that the cake thickness is relatively great along one side edge and thinner along another side edge.

Some times the cake layers are arranged as close together as possible, with minimal space therebetween. This is done so that the multi-tiered (multi-layered) cake can have a unitary stepped appearance without gaps or spaces between layers. When the cake layers have thickness variations within a given layer, or thickness variations from one layer to another layer there is a problem relating to correct selection of the support rods. The support rods for a given cake thickness have slightly different overall lengths. One common practice is for the user to have a box with many rods of different lengths. The user selects those rods that are the closest to the desired lengths.

Another practice is to change the length of a support rod by cutting it with a pair of scissors or pruning shears. Such support rods are of plastic having a relatively small diameter. e.g. about ¼ inch or less. The rods can be made as thin-walled sleeves to facilitate cutting thereof with a scissors.

Using scissors or pruning shears to change the length of a cake support rod is disadvantageous in that the cut end of the rod is usually not exactly flat or normal to the rod axis; often the scissors cut is at an acute angle to the desired normal plane. When the upper (or lower) ends of the rods are acutely angled, the loading on the rods is undesirably offset from the rod axis. Also, the rods have lessened end areas in contact with the cake plates, with consequent potential for shifting or sliding of the cake plate.

Using scissors or pruning shears for changing the length of a support rod is additionally disadvantageous because it can only be used to reduce the length of the rod; a scissors cut cannot be used to increase the length of the rod. If a given rod is too short for a given situation it has to be discarded; another longer rod has to be cut to the necessary length.

The use of a scissors to cut cake plate support rods is described generally in U.S. Pat. No. 3,814,032 issued in the name of Standlee McMains.

U.S. Pat. No. 2,902,174 to A. G. Audsley presents an alternative to the use of the support rods described above. Audsley proposes a series of individual support units, wherein each support unit (except the lowermost unit) comprises a circular plate having a depending tubular section that is externally threaded, and an upwardly projecting tubular section that is internally threaded. The tubular sections of the various support units thread together to form a unitary multi-level platform for a multi-tiered cake. The patentee indicates that the thread connections provide axial adjustability for thickness variations of the cake layers.

One problem with the arrangement proposed in Audsley 2,902,174 is that because the tubular sections have relatively large diameters the thread surface area is necessarily large; in some cases the frictional forces can make it difficult to turn one section relative to another. Also, in order to achieve a fine axial adjustment of one section relative to another the thread pitch has to be relatively small; small pitch threads are subject to being stripped.

A further disadvantage of the Audsley patent arrangement is that the threaded connections cannot compensate for thickness variations within a given cake layer. The cake platforms are necessarily parallel (horizontal), without the possibility for minor tilt adjustments necessary to compensate for gaps produced by thickness variations across the area of a given cake layer.

It is also noted that the Audsley patent arrangement requires special annular baking pans. Additionally, the Audsley cake support system would in practice be relatively expensive, since each support section has a different size; the tooling expense would be relatively high, due to the fact that each support section needs its own tooling. The support sections are not interchangeable, and the apparatus is limited to a three tier cake construction.

SUMMARY OF THE PRESENT INVENTION

The present invention contemplates a cake plate support system that comprises a plurality of adjustable length support rods individually insertable into a cake layer to provide support for a cake plate located immediately above the upper surface of the cake layer into which the rods are inserted. The lengths of individual rods can be adjusted separately, i.e. one rod can be made to be slightly longer or slightly shorter than a companion rod. Also, the individual rods can be either shortened or lengthened, so that if for some reason a rod should be adjusted to a length that is insufficient for its support function, it can be readjusted to a longer length.

The invention is conceived as a mechanism capable of compensating for thickness variations within a given cake layer and/or different overall cake thicknesses. The lengths of individual rods can be changed to adjust the supported cake plate into a level or near-level condition. Also, the rod length adjustment can be used to bring the supported cake plate into close adjacency to the surface of the subjacent cake layer, such that the cake plate can be concealed from view by the icing on the surfaces of the various cake layers. The entire cake can thus be made to assume a unitary one-piece stepped construction, without visible interruptions due to the presence of the cake plates at the cake layer interfaces. The rods can also be used with a tiered cake having pillars between adjacent layers.

THE DRAWINGS

DESCRIPTION OF A PREFERRED EMBODIMENT OF THE INVENTION

Figure 1:
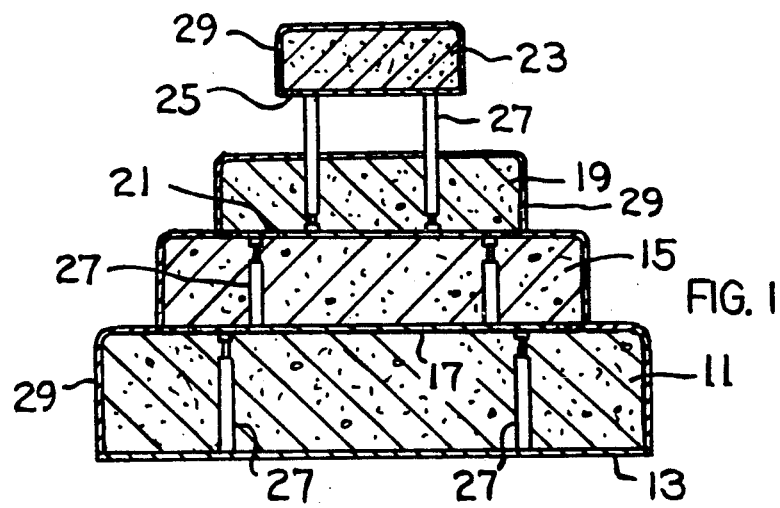
FIG. 1 is a sectional view through a cake having internal cake plate support rods of the present invention.

FIG. 1 shows a multi-tiered cake that includes a first lower cake layer 11 resting on a cake plate 13, a second cake layer 15 resting on a cake plate 17, a third cake layer 19 resting on a cake plate 21, and a fourth cake layer 23 resting on a cake plate 25. The diameter of each cake plate is the sam as the diameter of the associated cake layer. Cake plates 17, 21 and 25 are individually supported by adjustable length rod assemblies 27 of the present invention.

The number of rod assemblies 27 used to support a given cake plate is determined to a certain extent by the size (diameter) of the cake plate and the weight (thickness) of the associated cake layer. Typically, plate 17 might require six rod assemblies 27, whereas plate 21 might require five rod assemblies, and plate 25 might require only four rod assemblies. The cake plates are usually flat circular disks formed, for example, out of plastic sheet material, or an aluminum sheet, or a double faced corrugated cardboard material.

As shown in the drawing, the individual rods are inserted vertically into one cake layer so that their lower ends are engaged with a lower cake plate and their upper ends are engaged with an upper cake plate. In each case, the rods are arranged in a ring pattern spaced inwardly from the outer edge of the supported cake plate. The system of cake plates and intervening support rods provides an internal vertical support for the various cake layers. In the case of uppermost cake layer 23 and cake plate 25, the support rods are elongated so that cake plate 25 is spaced from the upper surface of cake layer 19. This is an optional feature. All of the cake layers could be in close adjacency to each other in the manner of the three lowermost cake layers.

Numeral 29 references an icing layer applied to the outer exposed surfaces of the cake layers. The icing layer can be applied to individual cake layers before assembly of the various cake plates and cake layers together. Alternately, the icing can be applied after the various cake layers have been assembled together (with the associated cake plates and support rods).

It will be noted that cake plates 17 and 21 are concealed from view by the icing 27 applied to the outer surfaces of cake layers 11, 15 and 19. This is advantageous in that the presence of the cake plates is not apparent to a person viewing the entire cake; the cake has a unitary appearance, without interruptions or visual discontinuities.

In order to achieve the desired effect, each cake plate 17 or 21 must be in close adjacency to the upper surface of the associated cake layer 11 or 15. It is usually necessary to make adjustments in the lengths of the associated support rods 27, since the cake layers are not always of uniform thickness, or the expected thickness, due to unavoidable factors associated with the baking process.

Figure 2:
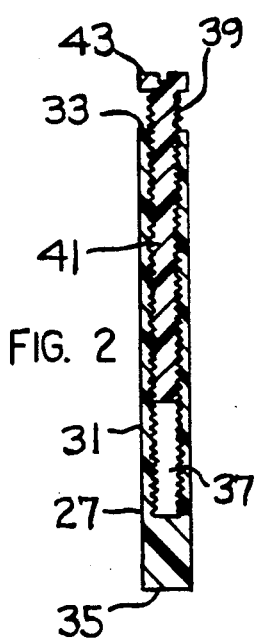
FIG. 2 is an enlarged sectional view taken through one of the support rods used in the FIG. 1 cake.
Figure 3:
FIG. 3 is a view taken in the same direction as FIG. 1, but showing an elongated rod structure according to the invention.

FIGS. 2 and 3 show a preferred adjustable length rod assembly 27 of the present invention. As seen in FIG. 2, the rod assembly comprises a main rod element 31 having an upper end 33 and a lower end 35. An axial bore 37 extends within the main rod element from its upper end partway along the rod element length. Lower end 35 is flat and normal to the rod element axis to promote an upright vertical positioning of the rod assembly when it is inserted into the cake layer.

A helical groove is formed on the bore 37 surface to provide an adjustable thread-type support for a rod extension element 39. Extension element 39 has a shank 41 extending within bore 37 and a head 43 located outside the bore. The surface of shank 41 is threaded to form a male thread in mesh with the female threaded surface of bore 37, whereby the extension element 39 can be screwed into or out of main rod element 31 to vary the overall length of the rod assembly.

A slot is formed in the upper face of head 43 for screwdriver adjustment of element 39. The exposed upper face of head 43 is flat and normal to the axis of element 39, to promote large area contact with the upper cake plate (FIG. 1). With the upper and lower end faces of the rod assembly flat and normal to the rod assembly axis, the rod assembly tends to assume an upright (non-slanted) condition when it is inserted into the cake layer. The rod assembly could be used in an inverted position, i.e. with end face 35 facing upwardly and head 43 facing downwardly. However, in that event, the screwdriver slot would be inaccessible after insertion of the rod assembly into the cake layer. Length adjustments of the rod assembly would require removal of the rod assembly from the cake layer. Preferably the rod assemblies are employed so that heads 43 face the space above the associated cake layer. Small adjustments in the rod assembly length can be made without removing the rod assembly from the associated cake layer.

Main rod element 31 can have any desired cross section, e.g. round, square, etc. With a non-circular cross section the rod element has better resistance against turning when it is embedded in the cake and screwdriver adjustments are made to rod extension element 39.

The screw threads on elements 31 and 39 preferably have a relatively fine pitch, e.g. twenty-four threads per inch. Each revolution of element 39 then produces a length change of about 0.04 inch, which is sufficient for this environment. Preferably the thread fit is relatively loose, so that when the main rod element is embedded in the cake, extension element 39 can be easily turned with a screwdriver.

The adjustable length rod assemblies can be made of various lengths to enable the rod assemblies to be used with a range of different thickness cake layers, e.g. two inch, three inch, or four inch. FIG. 3 shows an elongated rod assembly that might be used in the thicker cake layers.

Referring to FIG. 1, it will be seen that the rod assemblies 27 that support cake plate 25 are inverted, i.e. the head of the extension element is located at the lower end of the assembly. This is done so that the screw thread areas are concealed from view. In service the rod assembly performs in the same fashion, upright or inverted.

Figure 4:
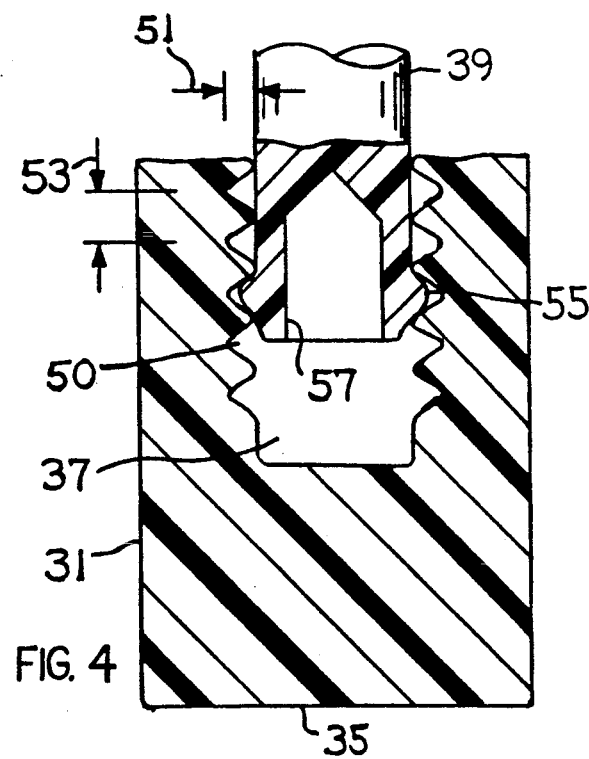
FIG. 4 is an enlarged fragmentary sectional view of another adjustable length rod structure that can be employed in the practice of the invention.

FIG. 4 shows an alternate type of adjustment that can be used between the main rod element and the associated extension element. In this case the surface of bore 37 has a series of regularly spaced annular grooves 50 formed therein. Each groove may have a radial depth dimension 51 of about 0.025 inch; the groove spacing dimension 53 may be about 0.04 inch.

Rod extension element 39 has an annular protuberance 55 at its lower end mated to grooves 50; a bore 57 may be formed in the lower end of element 39 to increase the flexibility of the annular protuberance.

Element 39 can be adjusted axially by exerting a pushing or pulling action thereon. Protuberance 55 snaps out of one groove and into the next groove to retain the rod assembly in its adjusted length.

The rod assemblies of FIGS. 2 and 4 are broadly similar. In each case, the bore of main rod element 31 is grooved to define a multiplicity of regularly-spaced groove sections along the length of the bore. In each case, the rod extension element has a shank having a circumferentially-extending ledge means (screw thread or protuberance) adapted to extend into the grooved bore surface for supporting the extension element in its various axially adjusted positions.

The drawings necessarily show specific structural embodiments of the invention. However, it will be appreciated that the invention can be practiced in various forms, using different dimensions and materials.

What is claimed is:

1. In a cake having a first cake layer having a first height, and a second cake layer having a second height, support apparatus comprising:
   a lower cake plate disposed beneath and supporting the first cake layer;
   an upper cake plate disposed on and in contiguous relationship with the top of the first cake layer for supporting the second cake layer above the first cake layer;
   a plurality of vertical rod assemblies imbedded in the first cake layer between the lower cake plate and the upper cake plate, each rod assembly having a lower end disposed on the lower cake plate in a lower contact point, and an upper end supporting the upper cake plate in an upper contact point, the vertical rod assemblies being horizontally spaced beneath the upper cake plate to provide a balanced support thereof, each of said rod assemblies comprising;
   an upright main rod having an upper end and a lower end, the main rod having an internally threaded bore extending within said main rod form one of said ends at least part way along the main rod length;
   a rod extension having a threaded shank of a first length extending within the bore, and a head located outside the bore, the head having a thickness substantially less than the length of the shank, the shank being threadedly engageable with the threads of the bore such that the rod extension is threadedly movable along the bore to thereby adjust the overall length of the rod assembly to accommodate the distance between the contact point of the rod assembly with the upper cake plate and the contact point of the rod assembly with the lower cake plate;
   whereby the individual overall length of each of the rod assemblies may be infinitely adjusted to accommodate a non-parallel spacing between the lower cake plate and the upper cake plate.

2. The rod assembly of claim 1, wherein said bore is helically grooved to form a female thread; said ledge means being a male thread meshed with the female thread, whereby rotational movement of the rod extension element causes the male thread to move along the female thread, to thereby shorten or lengthen the overall length of the rod assembly.

3. The rod assembly of claim 1, wherein said head has a flat upper face extending normal to the rod extension element axis; said main rod element having a flat lower face extending normal to the main rod element longitudinal axis.

4. The rod assembly of claim 1, and a screwdriver slot in the upper face of said head, whereby the rod element extension can be rotated around its axis.

5. The rod assembly of claim 1, wherein each thread has a thread pitch of approximately twenty-four threads per inch.

6. The rod assembly of claim 1, wherein the male thread has a relatively loose fit in the female thread, whereby when the main rod element is inserted into a cake layer, the rod extension element can be turned without disturbing the position of the main rod element.

7. In a cake having a first cake layer having a first height, a second cake layer having a second height, a lower cake plate disposed beneath and supporting the first cake layer; an upper cake plate disposed on and in contiguous relationship with the top of the first cake layer for supporting the second cake layer above the first cake layer; a plurality of vertical rod assemblies imbedded in the first cake layer between the lower cake plate and the upper cake plate, each rod assembly having a lower end disposed on and in contact with the lower cake plate, and an upper end supporting th upper cake plate and in contact therewith, the vertical rod assemblies being horizontally spaced beneath the upper cake plate to provide a balanced support thereof, the improvement comprising:

each of said rod assemblies having an upright main rod having an upper end and a lower end, the main rod having an internally threaded bore extending within said main rod from one of said ends at least part way along the rod element length;

a rod extension having a threaded shank of a first length in said bore, and a head located outside the bore, the head having a thickness substantially less than the length of the shank, the shank being threadedly engageable with the threads of the bore such that the rod extension is threadedly moveable along the bore to thereby adjust the overall length of the rod assembly to accommodate the distance between the contact point of the rod assembly with the upper cake plate and the contact point of the rod assembly with the lower cake plate;

whereby the individual overall length of each of the rod assemblies may be infinitely adjusted to accommodate a non-parallel spacing between the lower cake plate and the upper cake plate.

* * * * *